United States Patent Office 3,210,403
Patented Oct. 5, 1965

3,210,403
DIALLYLAMINO PHENYL N-METHYL
CARBAMATES
Rudolf Heiss and Ernst Böcker, Cologne-Stammheim,
and Günter Unterstenhöfer, Opladen, Germany, assignors to Farbenfabriken Bayer Aktiengesellschaft, Leverkusen, Germany, a corporation of Germany
No Drawing. Filed June 27, 1962, Ser. No. 205,569
Claims priority, application Germany, July 22, 1961,
F 34,509
5 Claims. (Cl. 260—479)

The present invention relates to and has as its object processes for the production of new and useful insecticidal diallylaminophenyl-N-methyl carbamic acid esters of the general formula

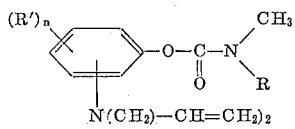

in which R stands for hydrogen or a methyl group, R' is a lower alkyl radical or a halogen atom and $n$ is equal to 0, 1 or 2 as well as the new compounds shown before.

It has been found that carbamic acid esters of the above mentioned formula, including those compounds wherein the substituted amino group on the phenyl ring is ortho amino or para amino, possess distinctive insecticidal properties and are therefore outstandingly suitable for combating plant pest insects, especially aphids, spider mites and caterpillars.

The production of compounds according to the invention proceeds according to known processes by reaction of the corresponding diallylaminophenol

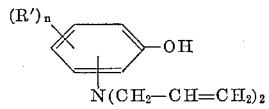

with methylisocyanate or methyl- or dimethyl-carbamic acid chloride. It is further possible to produce first the diallylaminophenyl ester of chloroformic acid of the general formula

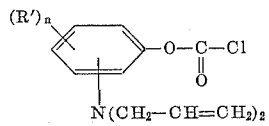

or bis(-diallylaminophenyl)-carbonic acid ester from the aforesaid aminophenols and phosgene of the general formula

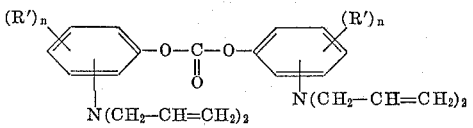

and to react these with methyl- or dimethyl amine. Finally the products of the process are accessible by transesterification of the above shown diallylaminophenols with N-methyl- or N,N-dimethyl-phenyl carbamate.

With respect to the insecticidal effect, the carbamic acid esters obtainable according to the process are clearly superior to the 3-dimethylaminophenyl-N-methyl carbamate having analogous structure and employed for the same purpose, as is apparent from the experimental results which follow.

| Compound | Biological activity | | |
|---|---|---|---|
| | Applied against | Active agent, percent concentration | Percent deaths of pests |
| <br>(structure: phenyl with —OC(=O)—NHCH₃ and N(CH₃)₂) | Caterpillars (*Plutella Maculipennis*). | 0.2<br>0.02 | 100<br>0 |
| | Dew flies (*Drosophila Melanogaster*). | 0.2 | 0 |
| | Aphids (*Aphis fabae*) | 0.2<br>0.02 | 100<br>40 |
| | Spider mites (*Tetranychus telarius*). | 0.2 | 40 |
| <br>(structure: phenyl with —O—C(=O)—CHCH₃ and N(CH₂—CH=CH₂)₂) | Caterpillars (*Plutella Maculipennis*). | 0.2<br>0.02<br>0.002 | 100<br>100<br>90 |
| | Dew flies (*Drosophila Melanogaster*). | 0.2 | 80 |
| | Aphids (*Aphis fabae*) | 0.2<br>0.02 | 100<br>100 |
| <br>(structure: (CH₂=CH—CH₂)₂N—phenyl(CH₃)(CH₃)(CH₃)—O—C(=O)—NHCH₃) | Caterpillars (*Plutella Maculipennis*). | 0.2<br>0.02 | 100<br>100 |
| | Dew flies (*Drosophila Melanogaster*). | 0.2 | 70 |
| | Spider mites (*Tetranychus telarius*). | 0.2<br>0.02 | 100<br>40 |

The use of the products of the process as pest control agents or plant protection agents proceeds in the usual way, i.e. preferably in admixture with solid or liquid extending or diluting agents, e.g. talc, chalk, soot, kieselguhr, bentonite, vermiculite and the like. For the production of liquid formulations water is primarily used as diluent, the simultaneous application of solvent assistants such as acetone, dimethyl formamide, o-chlorobenzene, xylene, and emulsifiers, being for the most part necessary or expedient, since the carbamic acid esters according to the invention are to a large extent water-insoluble. As emulsifiers those of a non-ionic type have proved to be especially suitable, e.g. polyglycol ethers of phenols. The following examples illustrate the process claimed.

*Example 1*

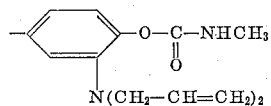

18.9 g. (0.1 mol) of 2-diallylphenol are dissolved in anhydrous benzene and this solution is treated first with 6.3 g. (0.11 mol) of methyl isocyanate and then with 3 drops of triethylamine. A vigorous reaction occurs with heating of the mixture. After standing for one day, the benzene solution is washed with water, dried over sodium sulphate, and the solvent is then distilled off under vacuum. As residue there are obtained 19.8 g. of 2-diallylaminophenyl-N-methyl carbamate of M.P. 39 to 40° C.

The 2-diallylaminophenol used as starting material is produced according to known methods by reaction of 2-aminophenol with allyl chloride in aqueous sodium bicarbonate solution.

By the same way there may be obtained the compounds of the following formulae:

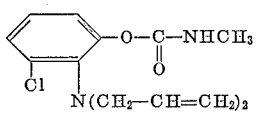

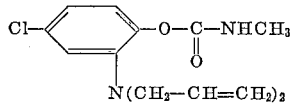

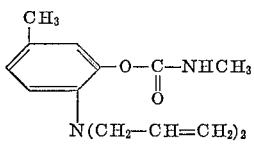

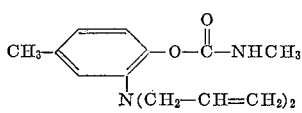

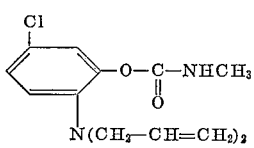

*Example 2*

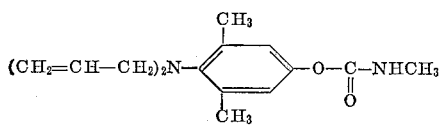

Under reaction conditions analogous to those of Example 1, 20.4 g. of 3,5-dimethyl-4-diallylaminophenyl-N-methyl carbamate of melting point 61 to 62° C. are obtained from 21.7 g. (0.1 mol) of 3,5-dimethyl-4-diallylaminophenol and 6.3 g. (0.11 mol) of methyl isocyanate.

*Example 3*

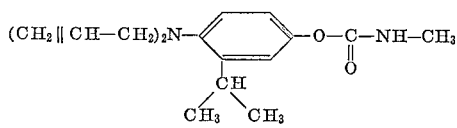

Under condition reactions analogous to those of Example 1, 24.2 g. of 3-isopropyl-4-diallylamino-phenyl-N-methyl carbamate are obtained by reaction of 23.1 g. (0.1 mol) 3-isopropyl-4-diallylamino-phenol and 6.3 g. methylisocyanate.

The resulting compound was then tested against caterpillars, aphids and spider mites as indicated below.

| Applied against | Biological activity | |
|---|---|---|
| | Active agent, percent concentration | Percent deaths of pests |
| Caterpillars (*Plutella maculipennis*) | 0.2 | 100 |
| | 0.02 | 100 |
| | 0.002 | 50 |
| Aphids (*Doralis fabae*) | 0.2 | 100 |
| | 0.02 | 100 |
| | 0.002 | 100 |
| Spider mites (*Tetranychus telarius* green resistant) | 0.2 | 100 |
| | 0.02 | 80 |

We claim:

1. A compound of the formula

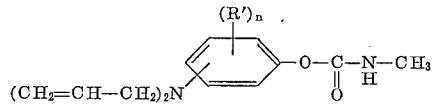

wherein R' is a member selected from the group consisting of methyl and chloro and $n$ is an integer of 1–2, $n$ being defined as 1 when R' is chloro and as 2 when R' is methyl; the diallyl amino moiety being attached to the phenyl ring in ortho position when R' is chloro and in para-position when R' is defined as a methyl group.

2. A compound of the following formula

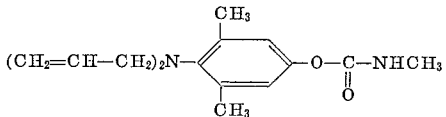

3. A compound of the formula

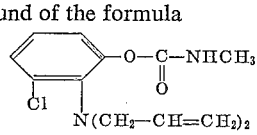

4. A compound of the formula

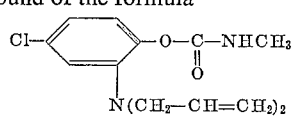

5. A compound of the formula

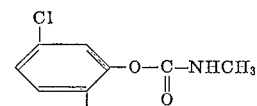

References Cited by the Examiner

UNITED STATES PATENTS

| 2,843,519 | 7/58 | Fitch | 167—30 |
| 2,854,374 | 9/58 | Huisman et al. | 167—30 |
| 2,984,682 | 5/61 | Kaeding | 260—479 |
| 3,060,225 | 10/62 | Shulgin | 260—479 |

FOREIGN PATENTS 446,303   1/48   Canada.

OTHER REFERENCES

Kolbezen et al.: Journal Agric. and Food Chem., 2, 864–70, (1954).

LORRAINE A. WEINBERGER, *Primary Examiner.*

A. LOUIS MONOCELL, LEON ZITVER, *Examiners.*